United States Patent
Ruberte Sanchez et al.

(10) Patent No.: US 9,568,036 B2
(45) Date of Patent: Feb. 14, 2017

(54) PUSH-LOCK PIN CONNECTOR

(71) Applicant: UNITED TECHNOLOGIES CORPORATION, Hartford, CT (US)

(72) Inventors: Jose E. Ruberte Sanchez, Jupiter, FL (US); Timothy J. McAlice, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 585 days.

(21) Appl. No.: 14/173,882

(22) Filed: Feb. 6, 2014

(65) Prior Publication Data

US 2014/0255182 A1 Sep. 11, 2014

Related U.S. Application Data

(60) Provisional application No. 61/776,257, filed on Mar. 11, 2013.

(51) Int. Cl.
*F02K 1/82* (2006.01)
*F16B 21/16* (2006.01)

(52) U.S. Cl.
CPC .......... *F16B 21/165* (2013.01); *F02K 1/822* (2013.01); *F02K 1/827* (2013.01); *Y02T 50/675* (2013.01); *Y10T 29/4932* (2015.01)

(58) Field of Classification Search
CPC ........ F16B 21/165; F02K 1/822; F02K 1/827; F02K 1/80; F02K 1/82; F23R 3/002;F23R 3/007; F23R 3/60; F23R 2900/00017
See application file for complete search history.

(56) References Cited

U.S. PATENT DOCUMENTS

| 6,283,660 B1 | 9/2001 | Furlong et al. |
| 6,664,953 B2 | 12/2003 | Quek |
| 7,508,383 B2 | 3/2009 | Lev et al. |
| 2014/0116057 A1* | 5/2014 | Peters ...................... F23M 5/04 60/753 |

FOREIGN PATENT DOCUMENTS

| EP | 1221383 | 7/2002 |
| GB | 2322401 | 8/1998 |

OTHER PUBLICATIONS

U.S. Appl. No. 13/661,650, filed Oct. 26, 2012.

* cited by examiner

*Primary Examiner* — Richard Edgar
(74) *Attorney, Agent, or Firm* — Carlson, Gaskey & Olds, P.C.

(57) ABSTRACT

A push-lock pin for connecting a tile to a gas turbine engine wall according to an exemplary aspect of the present disclosure includes, among other things, a housing extending longitudinally along an axis; a shaft assembly within the housing, the shaft assembly including a push-down pop-up mechanism and a locking mechanism, the locking mechanism moveable to a locked position such that the locking mechanism limits movement of a tile away from a gas turbine engine wall; and a stop feature to limit movement of the tile toward the gas turbine engine wall.

20 Claims, 9 Drawing Sheets

PUSH-LOCK PIN CONNECTOR

CROSS-REFERENCE TO RELATED APPLICATIONS

This disclosure claims priority to U.S. Provisional Application No. 61/776,257, which was filed on 11 Mar. 2013 and is incorporated herein by reference.

BACKGROUND

Aircraft engines, in both commercial and military aircraft, incorporate heated gas flows as part of their standard operations. In order to protect portions of the engine from the excess heat generated by the heated gas flows, insulation tiles are installed in some areas of the gas flow path.

With current fastener designs, a technician installing or replacing the insulation tiles requires access to the backside of the engine substructure that the tile is attached to. In order to access the backside of the substructure, the engine is removed from the aircraft. Removing the engine to facilitate replacing or repairing an insulation tile significantly increases cost beyond the actual costs of replacing the tile itself.

SUMMARY

A push-lock pin for connecting a tile to a gas turbine engine wall according to an exemplary aspect of the present disclosure includes, among other things, a housing extending longitudinally along an axis; a shaft assembly within the housing, the shaft assembly including a push-down pop-up mechanism and a locking mechanism, the locking mechanism moveable to a locked position such that the locking mechanism limits movement of a tile away from a gas turbine engine wall; and a stop feature to limit movement of the tile toward the gas turbine engine wall.

In a further non-limiting embodiment of the foregoing push-lock pin, the locking mechanism is moveable between the locked position and an unlocked position in response to actuation of the push-down pop-up mechanism.

In a further non-limiting embodiment of any of the foregoing push-lock pins, the tile is free to move away from the gas turbine engine wall when the locking mechanism is in the unlocked position.

In a further non-limiting embodiment of any of the foregoing push-lock pins, the stop member and the locking feature are configured to capture at least a portion of the gas turbine engine wall when the locking feature is in the locked position.

In a further non-limiting embodiment of any of the foregoing push-lock pins, the stop member is a collar extending radially from the housing.

In a further non-limiting embodiment of any of the foregoing push-lock pins, the locking mechanism comprises a plurality of spherical bearings positioned to move radially outward and inward in response to an axial position of the shaft assembly relative to the housing.

In a further non-limiting embodiment of any of the foregoing push-lock pins, the push-down pop-up mechanism comprises a separate pin component and a cam having a low equilibrium point and a high equilibrium point, wherein a biasing member is maintained in a more biased state when the cam is at the high equilibrium point, and the biasing member is maintained in a less biased state when the cam is at the low equilibrium point.

In a further non-limiting embodiment of any of the foregoing push-lock pins, the locking mechanism comprises a plurality of tapered blocks positioned to move radially outward and inward in response to an axial position of the shaft assembly relative to the housing.

In a further non-limiting embodiment of any of the foregoing push-lock pins, each of the plurality of tapered blocks rides against outwardly facing planar surfaces of the shaft when the locking mechanism is moved between the locked position and an unlocked position.

In a further non-limiting embodiment of any of the foregoing push-lock pins, the shaft comprises a rotatable portion and a separate fixed portion that interfaces with the plurality of tapered blocks.

A gas turbine engine assembly according to another exemplary aspect of the present disclosure includes, among other things, a tile; and a shaft assembly within a housing, the shaft assembly including a push-down pop-up mechanism and a locking mechanism, the locking mechanism moveable to a locked position such that the locking mechanism limits movement of the tile away from a gas turbine engine wall; and a floating support secured to the gas turbine engine wall, the floating support providing an aperture that receives the shaft assembly.

In a further non-limiting embodiment of the foregoing gas turbine engine, the floating support is laterally adjustable relative to the gas turbine engine wall when secured to the gas turbine engine exhaust gas path wall.

In a further non-limiting embodiment of any of the foregoing gas turbine engines, the floating support comprises a cup-shaped portion that extends through the aperture in the gas turbine engine wall.

In a further non-limiting embodiment of any of the foregoing gas turbine engines, a shaft assembly within the housing wherein the shaft comprises a locking mechanism, and a push-down pop-up mechanism, a cap connected to a first axial end of the shaft, and a spring connected to a second axial end of the shaft, wherein the second axial end is axially opposite the first axial end.

In a further non-limiting embodiment of any of the foregoing gas turbine engines, the tile comprises a ceramic tile.

In a further non-limiting embodiment of any of the foregoing gas turbine engines, the locking mechanism comprises a ball lock section of the shaft and a locking feature, wherein the ball-lock section has a larger diameter than a remainder of the shaft, and the locking feature is adjacent the ball-lock section of the shaft when the shaft is in a locked position.

In a further non-limiting embodiment of any of the foregoing gas turbine engines, the cap protrudes from a ceramic tile surface face when the pin is in an unlocked position, thereby operating as a handle.

A method of connecting a tile to a gas turbine engine wall, according to an exemplary aspect of the present disclosure includes, among other things, using a push-down pop-up mechanism to move a locking mechanism between an unlocked position and a locked position; limiting movement of a tile away from a gas turbine engine wall when the locking mechanism is in the locked position; and limiting movement of the tile toward the gas turbine engine wall using a stop member whether the locking mechanism is in the unlocked or the locked position.

In a further non-limiting embodiment of the foregoing method of connecting a tile, the method includes moving a plurality of tapered blocks of the locking mechanism to move between the unlocked position or the locked position.

In a further non-limiting embodiment of either of the foregoing methods of connecting a tile, each of the plurality of tapered blocks rides against outwardly facing planar surfaces when the locking mechanism is moved between the unlocked position and the locked position.

These and other features of the present invention can be best understood from the following specification and drawings, the following of which is a brief description.

DETAILED DESCRIPTION

Figure 1:
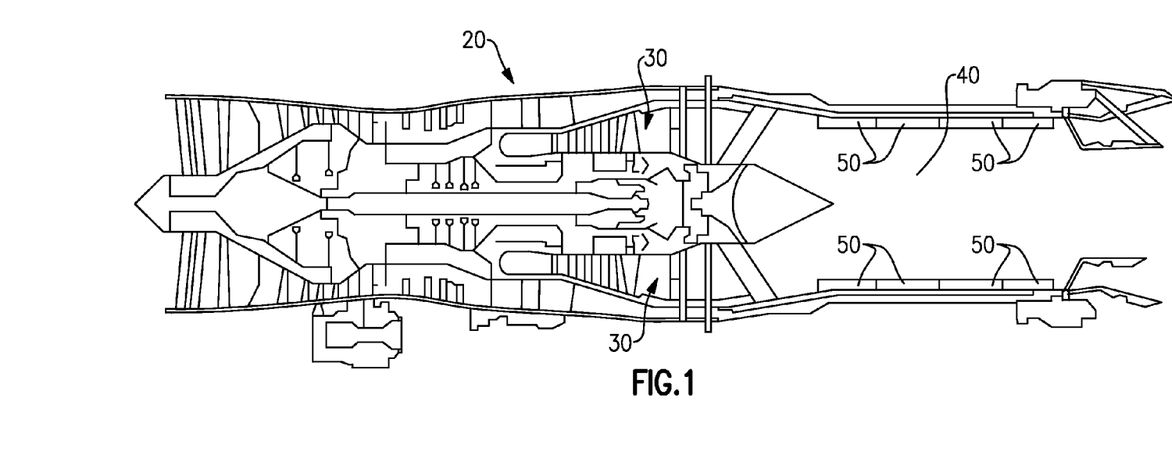
FIG. 1 schematically illustrates an example gas turbine engine.

Referring to FIG. 1, an example gas turbine engine 20 including a gas path 30 that outputs heated gas into an exhaust gas path 40. To prevent heat damage to the exhaust gas path 40 walls, and to other components adjacent the exhaust gas path 40, the exhaust gas path 40 is lined with tiles, such as ceramic insulation tiles 50. The example ceramic insulation tiles 50 are each connected to the walls of the exhaust gas path 40 via a number of push-lock connector pins.

Existing exhaust liners utilize a single metal sheet with multiple air holes. Cooling air is pumped through the air holes to cool the exhaust gas path 40 according to known active cooling techniques. The existing exhaust gas path 40 liners are permanently affixed to the turbine engine exhaust gas path 40 walls. As a result, in order to perform maintenance on the exhaust gas path liner the gas turbine engine 20 must be removed from the aircraft.

The example ceramic insulation tiles 50 of this disclosure have a significantly higher heat capacity than a metal liner and thus do not need to be actively cooled to prevent heat from passing through the exhaust gas path 40 walls. The ceramic insulation tiles 50 are each individually connected to the exhaust gas path walls, and combine to form a tiled exhaust gas path liner that protects engine components adjacent to the exhaust gas path from excess heat.

Figure 2:
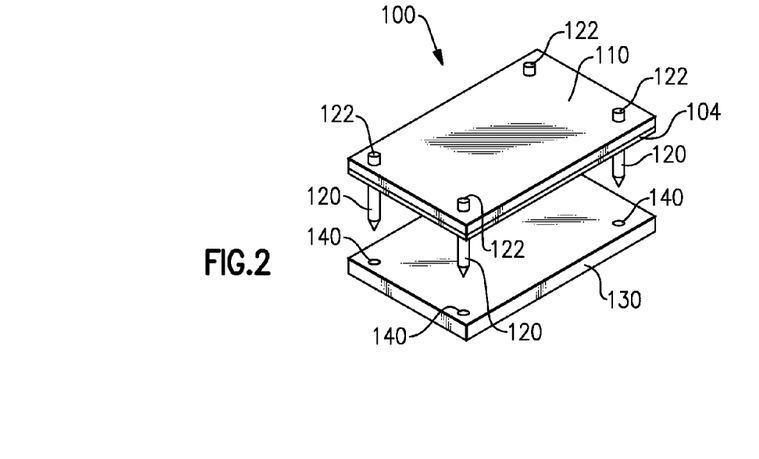
FIG. 2 schematically illustrates an insulation tile assembly that can be used in the gas turbine engine of FIG. 1.

FIG. 2 schematically illustrates an example insulation tile assembly 100 that can be used in the exhaust gas path 40 of FIG. 1. The insulation tile assembly 100 includes a tile 110 with multiple push-lock connectors 120 protruding from the tile 110. In this example, the tile 110 is a ceramic tile mounted to a base plate 104. The push-lock connectors 120 engage with a substrate 130 (such as a metal substrate of the exhaust gas path 40 walls) via corresponding connection features 140 in the substrate 130. The corresponding connection features 140 are apertures in this example. In another example, the push-lock connectors 120 may extend from the substrate 130 rather than the tile 110.

To connect the tile 110 to the substrate 130, the push-lock connectors 120 are inserted into the connection features 140. Once inserted, a cap 122 on the push-lock connector 120 is pushed, placing the push-lock connector in a locked position. To unlock the push-lock connector 120, the cap 122 is pushed again, placing the push-lock connector 120 in an unlocked position. When the push-lock connectors 120 are in the locked position, the ceramic tile 110 cannot be removed from the substrate 130. In the locked position, the cap 122 is flush with the surface of tile 110.

When the push-lock connectors 120 are in the unlocked position, the ceramic tile 110 can be removed and replaced. In the unlocked position, cap 122 is protruding from the surface of tile 110. This creates a handle to facilitate the removal of tile 110. The cap 122 further includes a top ceramic surface matching the ceramic tile 110 such that the cap 122, when the push-lock connector 120 is in the locked position, has a ceramic surface flush with the ceramic tile 110.

Figure 3A:
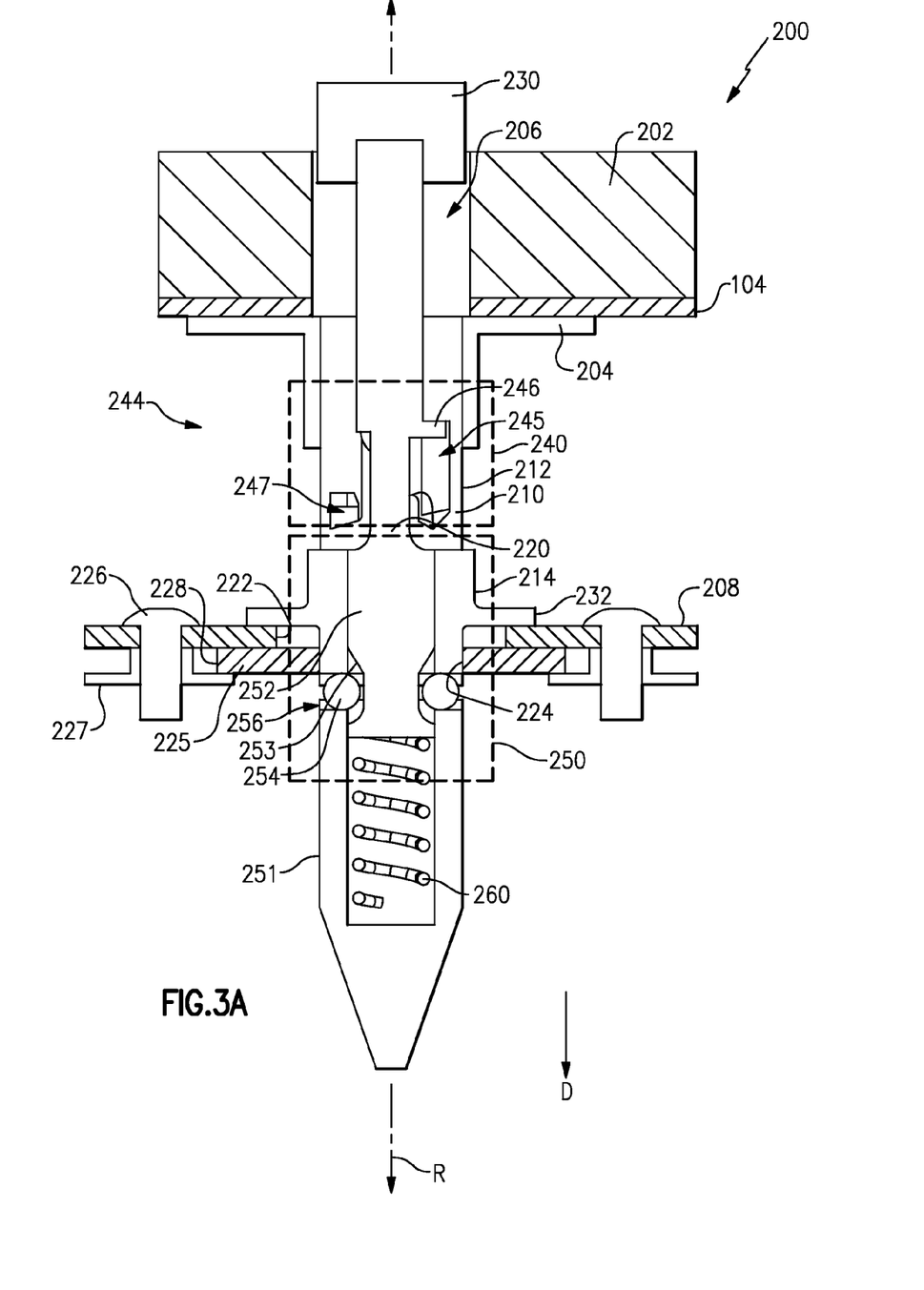
FIG. 3A schematically illustrates a first example push-lock pin connector in an unlocked position.
Figure 3B:
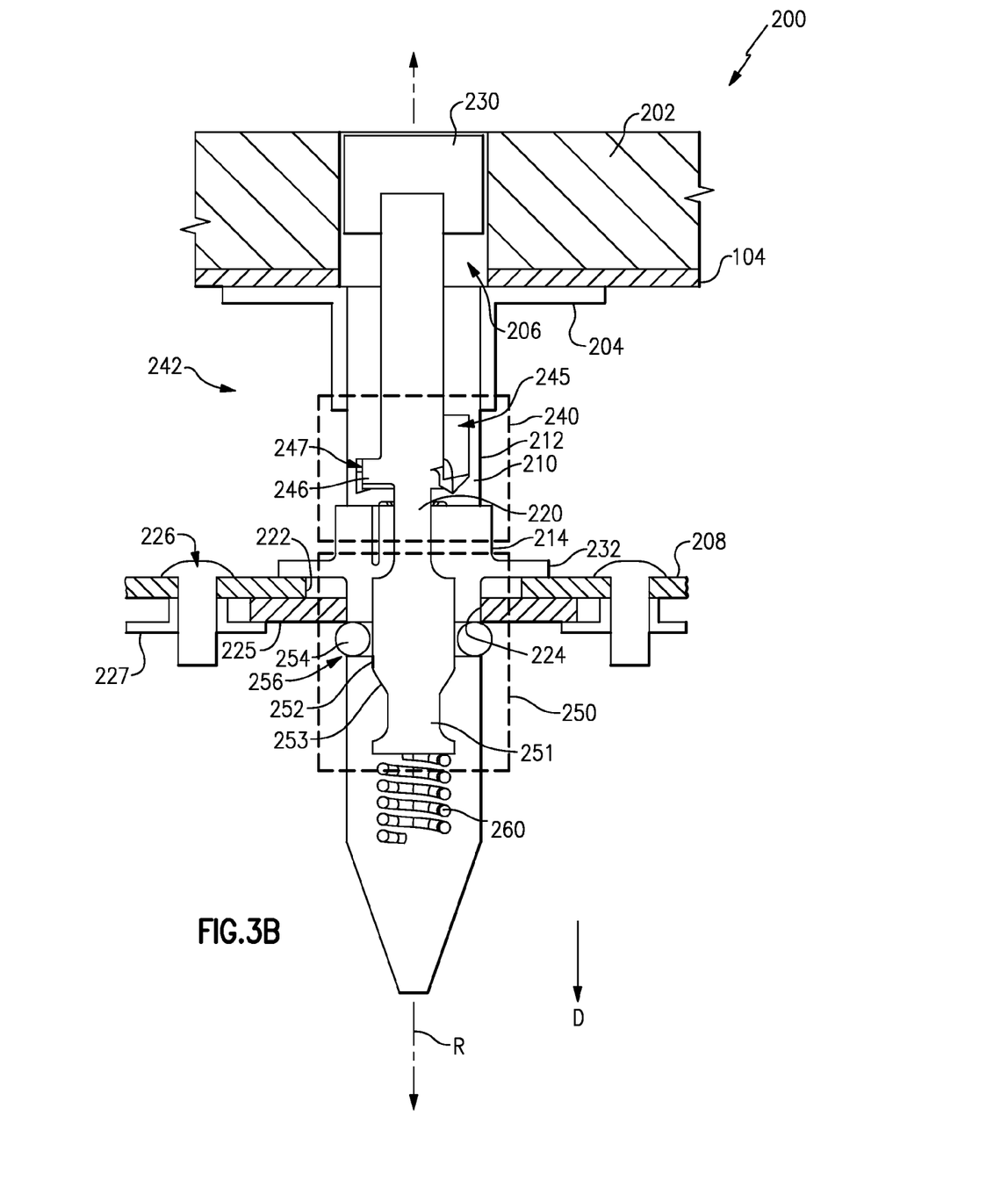
FIG. 3B schematically illustrates the first example push-lock pin connector in a locked position.

FIGS. 3A to 7 illustrate a first example push-lock pin 200 that can be utilized in the example ceramic insulation tile arrangement of FIG. 2, with FIG. 3A illustrating the push-lock pin 200 in an unlocked position and FIG. 3B illustrating the push-lock pin 200 in a locked position. The push-lock pin 200 secures a tile 202 to a substrate 208. The tile is a ceramic tile in this example.

The example push-lock pin 200 includes the housing 210 and a shaft assembly 220 received within the housing 210 extending longitudinally along a radial axis R. In operation, the shaft 220 is moved relative to the housing 210 to permit or restrict movement of push-lock pin 200 relative to the substrate 208.

The push-lock pin 200 extends through an opening 206 in the tile 202. The housing 210 of the push-lock pin 200 is directly affixed to the tile 202 via a fastener 204. The fastener 204 can be any bracket type fastener and can be affixed to the housing 210 and the tile 202 using any known method.

The example housing 210 includes a guide 212 and a tip 214. One axial end of the guide 212 includes tabs 216 that are received within slots 218 of the tip 214 to limit relative rotation between the guide 212 and the tip 214. The guide 212 may include slots and the tip 214 many include tabs in other examples.

An axial end of the guide 212 opposite the slots 218 is tapered to assist in moving the push-lock pin 200 into an aperture 222 of the substrate 208 during installation of the tile 202 to the substrate 208. The guide 212 extends through the aperture 222 in the substrate 208 and an aperture 224 within a floating support, such as a washer 225. The aperture 224 is smaller than the aperture 222.

Pins 226, or some other type of fastener, are used to secure the washer 225 to the substrate 208. The washer 225 is held between flanged bushings 227 and the substrate 208 in this example, which allows the washer 225 to float or shift slightly relative to the substrate 208 while still being held securely. The washer 225 can be considered laterally adjustable due to its ability of float or shift.

The washer 225 includes cutouts 228. The cutouts 228 are hemispherical in this example, but could have other profiles. The cutouts 228 provide the washer with freedom to shift. The washer 225 is thus held such that some movement of the aperture 224 relative to the aperture 222 is permitted.

During assembly, when the guide 212 is inserted into the apertures 222 and 224, the aperture 224 may need to move or shift relative to the aperture 222. Relative movement may be required to accommodate expansion and contraction, of the washer 225 relative to the flanged bushings 227, the pins 226, or both. Relative movement may be required due to build-tolerances.

The guide 212 includes a collar 232 extending outward from the guide 212. The collar 232 extends radially past the perimeter of the aperture 222, which prevents the push-lock pin 200 and the tile 202 from moving in a direction D. The collar 232 enables the push-lock pin 200 to absorb compressive loads against the tile 202 in the direction D.

The collar 232 is an example type of stop feature. Other examples may include ridges, pins, arms, etc., that extend outward from the guide 212 or some other portion of the push-lock pin 200.

Figure 4:
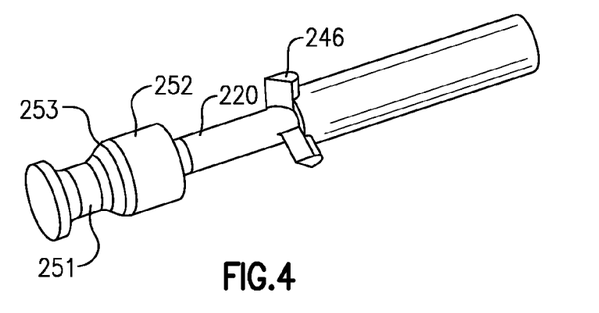
FIG. 4 illustrates a perspective view of a shaft assembly of the first example push-lock pin connector.
Figure 5A:
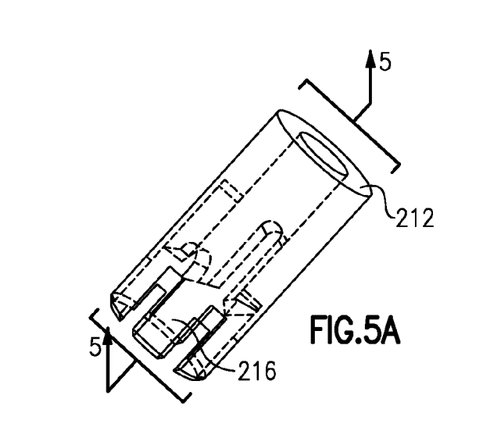
FIG. 5A illustrates a perspective view of a guide of the first example push-lock pin connector.
Figure 5B:
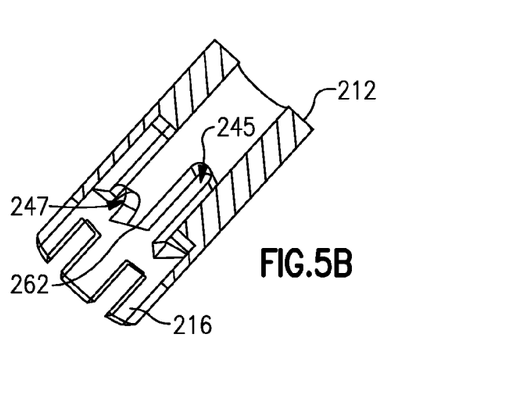
FIG. 5B is a section view at line 5-5 in FIG. 5A.
Figure 6A:
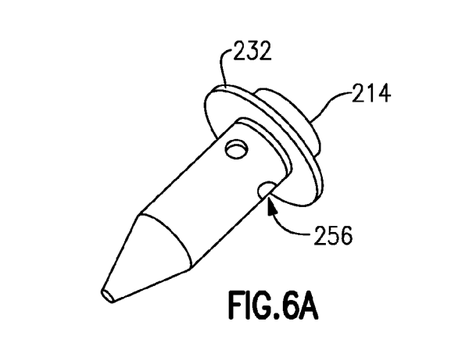
FIG. 6A illustrates a perspective view of a tip of the first example push-lock pin connector.
Figure 6B:
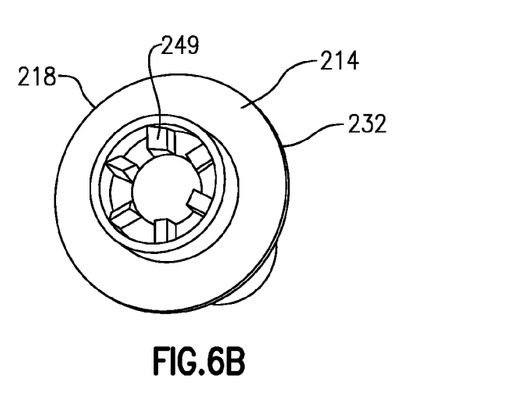
FIG. 6B illustrates another perspective view of the tip of FIG. 6A.
Figure 7:
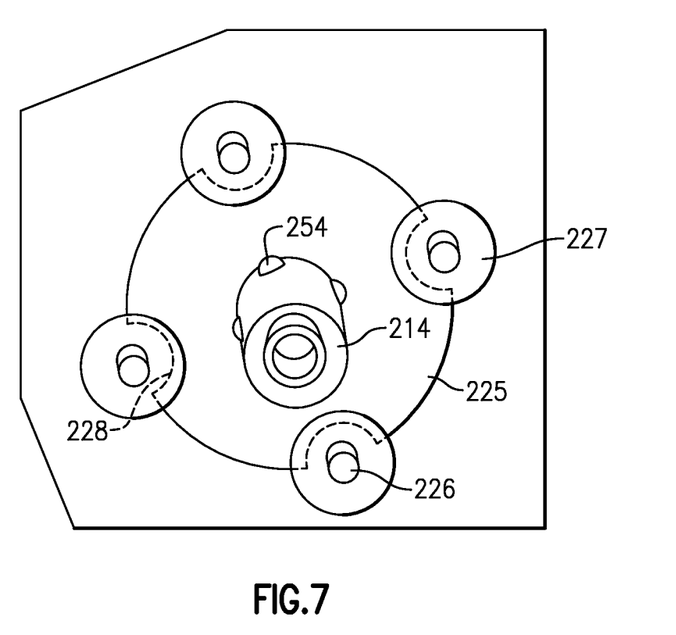
FIG. 7 illustrates a perspective view of the tip of the first example push-lock pin connector in an installed position.

The example shaft 220 includes portions of a ball-locking mechanism 250 and portions of a push-down pop-up mechanism 240. The cap 230 is attached to a first axial end of the shaft 220. A spring 260 is positioned on a second axial end of the shaft 220 opposite the first axial end. In some example arrangements, such as the arrangement of FIGS. 3A and 3B, the shaft 220 includes features causing the shaft 220 to rotate within the housing 210 whenever the cap 230 is depressed.

Referring now to the ball-locking mechanism 250, the shaft 220 includes a narrow section 251, a wide section 252, and an angled section 253. Multiple locking features 254, such as spherical ball bearings, surround the shaft 220. When the shaft 220 shifts axially from the unlocked position of FIG. 3A to the locked position of FIG. 3B, the locking features 254 shift from the narrow section 251, across the angled section 253, to the wide section 252.

Adjacent to the locking features 254 are multiple openings 256 in the tip 214. When the push-lock pin 200 is in an unlocked position, the locking features 254 are contained within the tip 214 of the housing 210 due to their axial alignment with the narrow section 251. The push-lock pin 200 can thus be removed from the substrate 208. The push-lock pin 200 can be removed by moving the push-lock pin 200 in a direction opposite the direction R.

When the push-lock pin 200 is in a locked position of FIG. 3B, the locking features 254 are pushed partially radially out of the openings 256 due to their axial alignment with the wide section 252. In this position, the locking features 254 prevent the push-lock pin 200 from being removed from the substrate 208. Contact between the locking features 254 and the washer 225 prevents the push-lock pin 200 from being withdrawn. Contacting the locking features 254 against the washer 225 rather than the substrate 208 facilitates positional variations due to relative thermal expansion between components. The washer 225 can shift slightly relative to the substrate 208, but still provide an effective anchoring location for the locking features 254.

In this example, the push-down pop-up mechanism 240 of the push-lock pin 200 comprises mechanical features of the shaft 220, the guide 212, and the tip 214. The shaft 220 defines at least a deep groove 245 and a shallow groove 247. The guide 212 includes at least one finger 246 that is received within the deep groove 245 or the shallow groove 247 depending on the circumferential orientation of the shaft 220 relative to the guide 212.

When the finger 246 is located in the deep groove 245, the finger 246 is in a low equilibrium point 242. When the finger 246 is in the shallow groove 247, the finger 246 is in a high equilibrium point 244. Activation of the cap 230 causes the finger 246 to move between the low equilibrium point 242 and the high equilibrium point 244.

More specifically, pressing the cap 230 moves the finger 246 axially out of the deep groove 245 or the shallow groove 247. When the cap 230 is released, the spring 260 exerts an axial force on the shaft 220 causing the finger 246 to contact a ramped area 262. As the finger 246 is pressed axially against the ramped area 262 by the spring 260, the finger 246 slides against the ramped area 262 causing the shaft 220 to rotate. If the finger 246 was in the deep groove 245, the rotation causes the finger 246 to move into the shallow groove 247. If the finger 246 was in the shallow groove 247, the rotation causes the finger 246 to move into a deep groove 245. The tip 222 may also include a ramped area 249 to help the shaft 220 to rotate.

Activating the push-down pop-up mechanism (depressing the cap 230) thus shifts the finger 246 from one equilibrium point 242, 244 to the other equilibrium point 242, 244. When the finger 246 is in the high equilibrium point 244 (FIG. 3B) the ball-locking mechanism 250 is maintained in the locked position via a combination of the finger 246 and the axial force provided by the spring 260. Similarly, the cap 230 is maintained approximately flush with the tile 202. Conversely, when the finger 246 is resting in the low equilibrium point 242, the ball-locking mechanism 250 is unlocked, and the cap 230 is not flush with the tile 202.

Figure 8A:
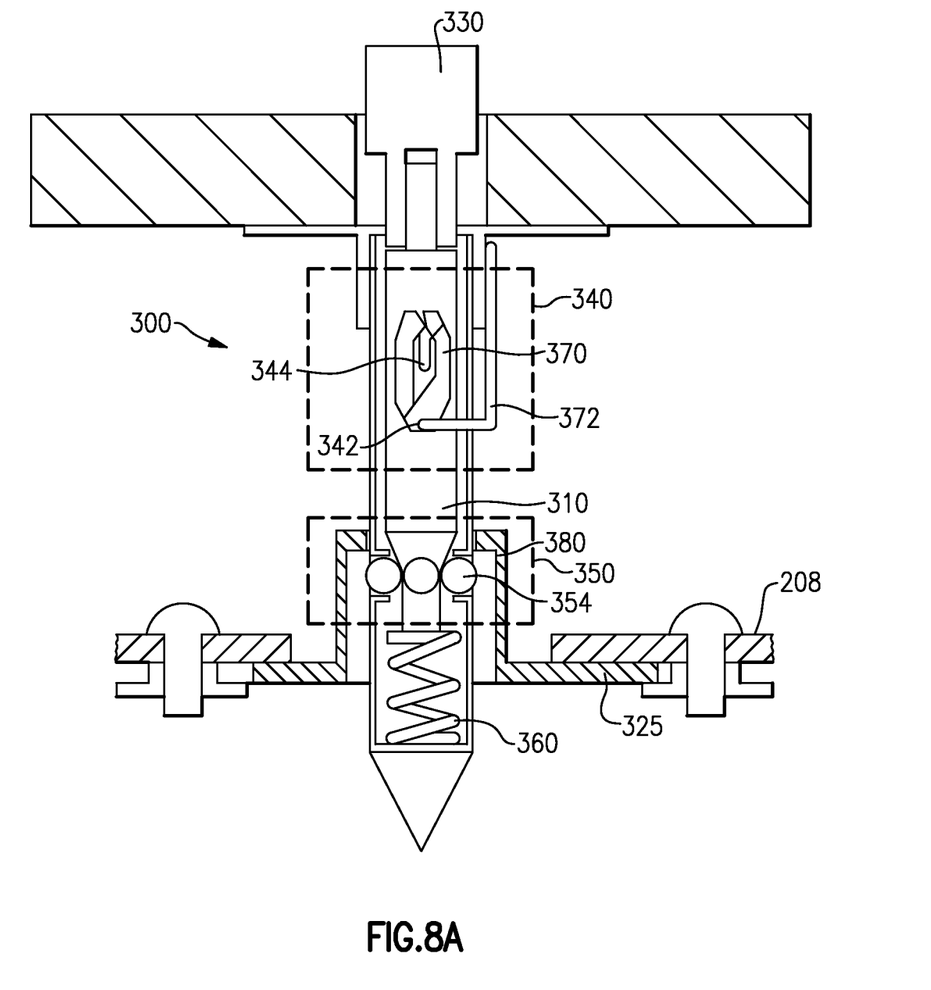
FIG. 8A schematically illustrates a second example push-lock pin connector in an unlocked position.
Figures 8B, 8C:
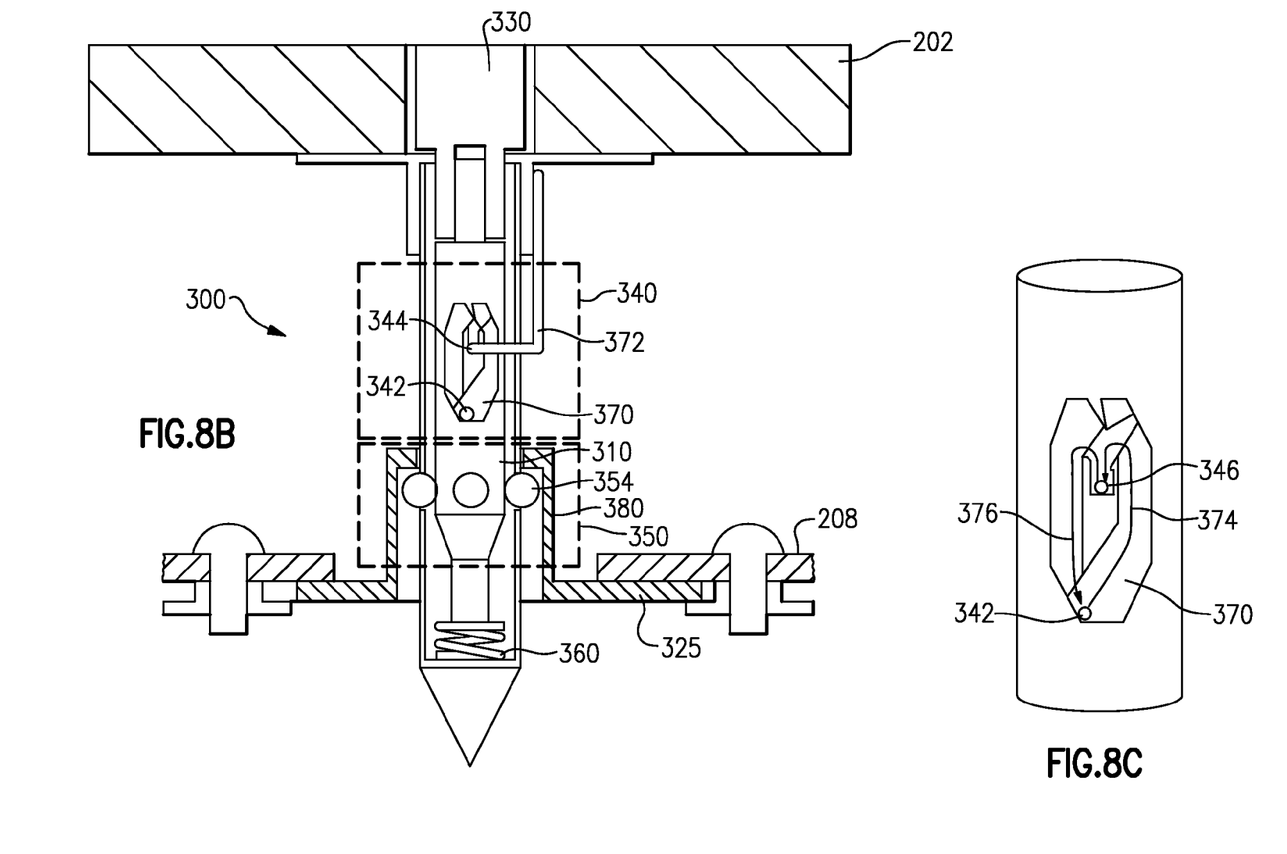
FIG. 8B schematically illustrates the second example push-lock pin connector in a locked position.
FIG. 8C illustrates the cam structure of FIGS. 8A and 8B in greater detail.

FIGS. 8A, 8B, and 8C illustrate another example push-lock pin 300 including a different push-down pop-up mechanism 340, with FIG. 8A illustrating the push-lock pin 300 in an unlocked position, FIG. 8B illustrating the push-lock pin 300 in a locked position, and FIG. 8C illustrating a push-down pop-up mechanism 340 in greater detail. The ball-locking mechanism 350 functions generally the same as the ball-locking mechanism 250 of FIGS. 3A and 3B.

The push-down pop-up mechanism 340 of the FIGS. 8A-8C embodiment utilizes a cam structure 370 and a separate pin component 372. The separate pin component 372 replaces the finger 246 of the FIGS. 3A and 3B embodiment.

The push-down pop-up mechanism 340 includes the cam structure 370 with a high equilibrium point 344 and a low equilibrium point 342. The separate pin 372 extends into the cam structure 370 and rests in one of the equilibrium points 342, 344. Activation of the push-lock pin 300 causes the separate pin component 372 to shift from a current equilibrium point to the other equilibrium point 342, 344.

FIG. 8C schematically diagrams the movement of the separate pin component 372 from the low equilibrium point 342 to the high equilibrium point 344 along a movement path 374.

FIG. 8C also schematically diagrams the movement from the high equilibrium point 344 to the low equilibrium point 342 along a movement path 376. The contours of the cam structure 370 ensure that the separate pin component 372 follows the illustrated movement paths 374, 376 and properly transitions between the high equilibrium point 344 and the low equilibrium point 342 when the cap 330 is depressed.

In this example, a washer 325 has a cup-shaped portion 380 that extends from radially outside the substrate 208 to radially inside the substrate 208. Locking features 354 of this embodiment rest against an interior of the cup-shaped portion 380 when the push-lock pin 300 is locked. The locking features 354 are located radially inside the substrate 208 in at least the locked position. The washer 325, with the cup-shaped portion 380, can float somewhat relative to the substrate 208.

Figures 9A, 9B, 9C:
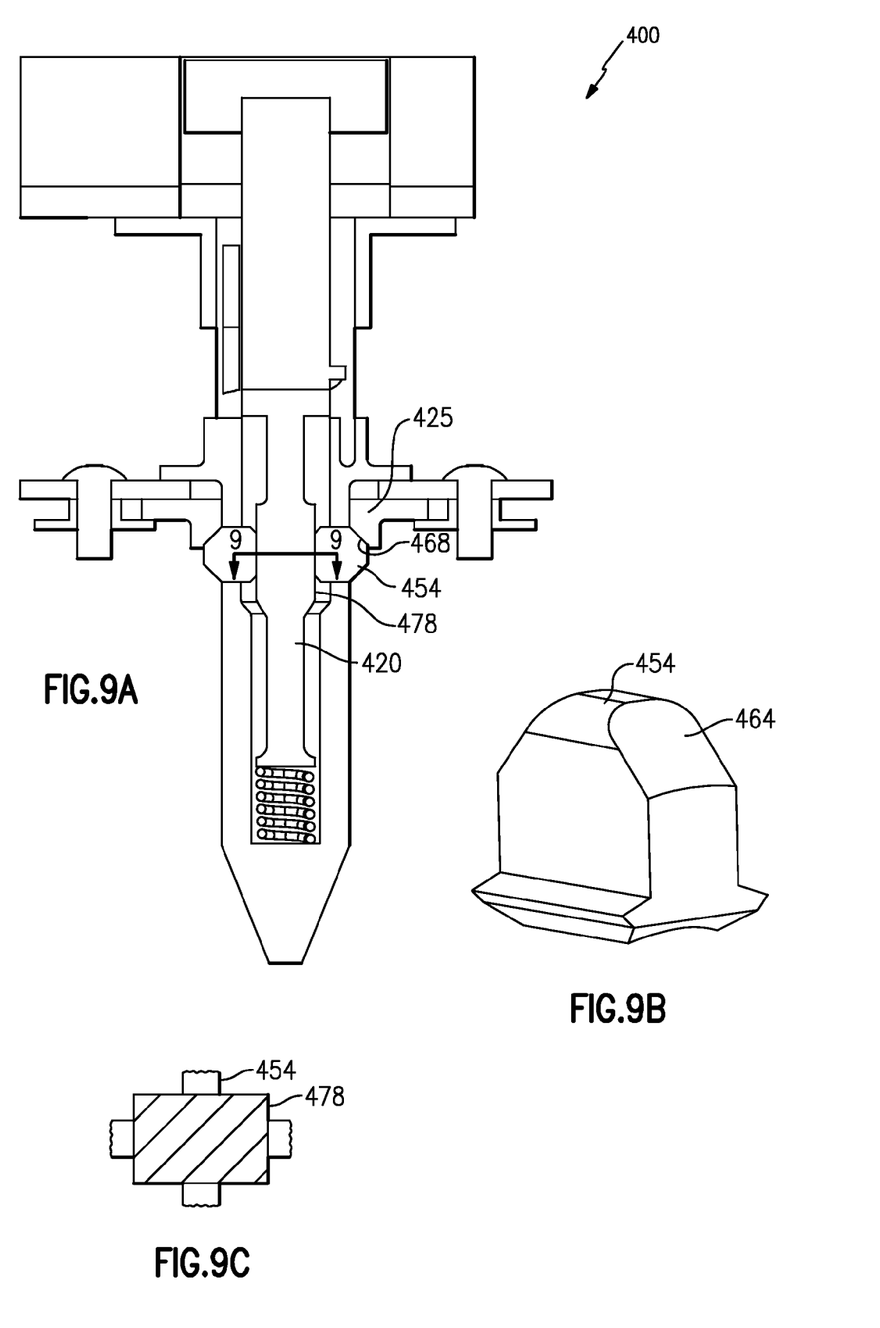
FIG. 9A schematically illustrates a third example push-lock pin connector in a locked position.
FIG. 9B illustrates a perspective view of a locking feature of the third example push-lock pin connector.
FIG. 9C is a section view at line 9-9 in FIG. 9A.

Referring now to FIGS. 9A-9C, another example push lock pin 400 includes locking features 454 that are tapered blocks having conical surfaces 464 or chamfers. The flat surfaces 464 rest against corresponding surfaces 468 on a washer 425 when the push-lock pin 400 is in a locked position. As the push-lock pin moves between locking and unlocked positions, the locking features 454 slide along faces 478 of a shaft assembly 420.

Figure 9D:
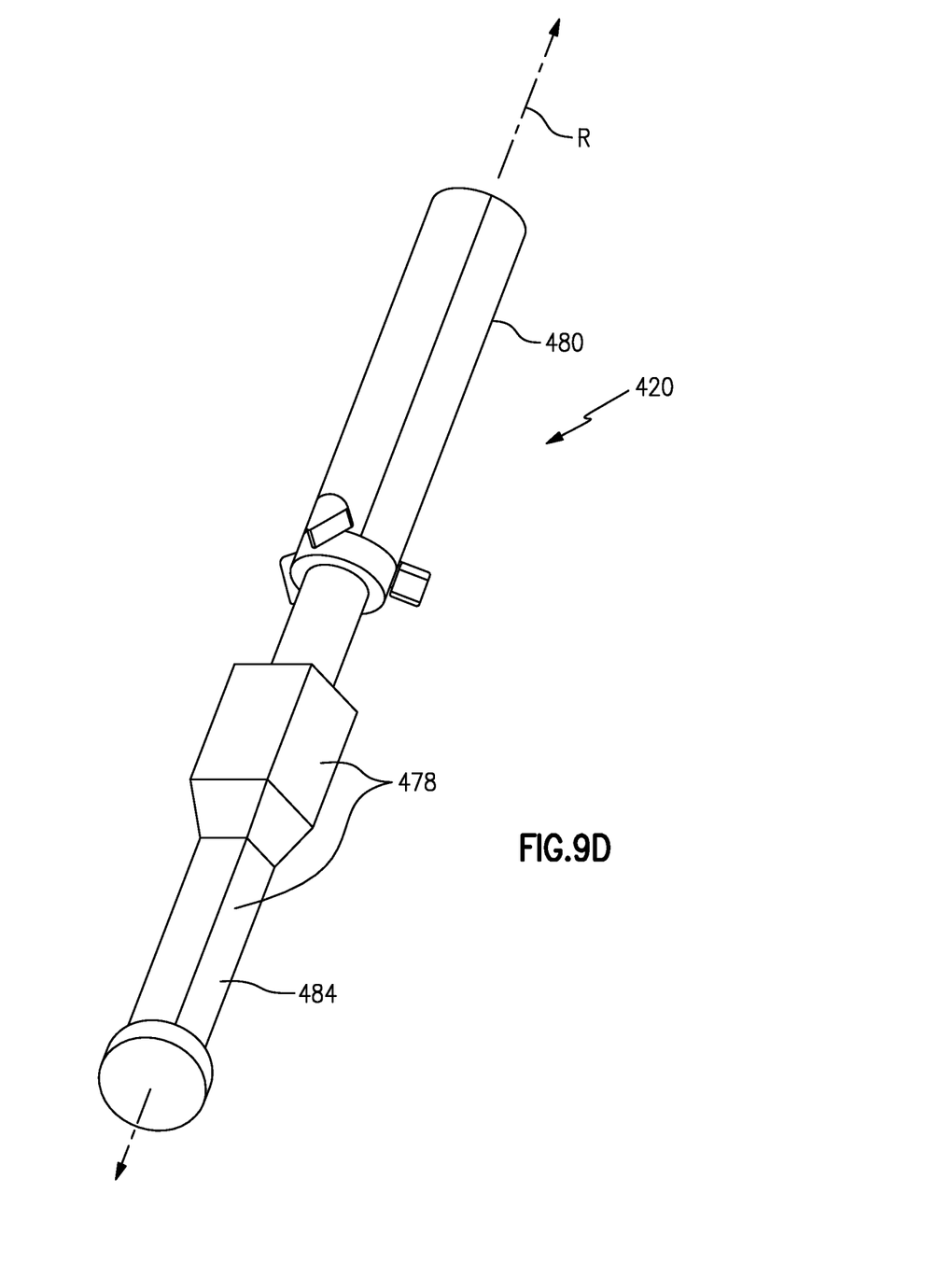
FIG. 9D illustrates a perspective view of a shaft assembly of the third example push-lock pin connector.

The example shaft 420 is a two piece shaft having a rotatable portion 480 and a separate, fixed portion 484. The rotatable portion 480 rotates about radial axis R when the push-lock pin 400 is moved from between the locked and unlocked positions. Because the fixed portion 484 does not rotate, the locking features 454 maintain their circumferential orientation relative to the radial axis R and remain associated with a respective one of the faces 478.

While the above disclosure is directed toward insulation tiling for an aircraft engine, it is understood that the described connector pin can be utilized in any application where it is desirable to connect a tile to a surface without providing access to a reverse side of the surface.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A push-lock pin for connecting a tile to a gas turbine engine wall comprising:
a housing extending longitudinally along an axis;
a shaft assembly within the housing, the shaft assembly including a push-down pop-up mechanism and a locking mechanism, the locking mechanism moveable to a locked position such that the locking mechanism limits movement of a tile away from a gas turbine engine wall; and
a stop feature to limit movement of the tile toward the gas turbine engine wall.

2. The push-lock pin of claim 1, wherein the locking mechanism is moveable between the locked position and an unlocked position in response to actuation of the push-down pop-up mechanism.

3. The push-lock pin of claim 2, wherein the tile is free to move away from the gas turbine engine wall when the locking mechanism is in the unlocked position.

4. The push-lock pin of claim 1, wherein the stop member and the locking feature are configured to capture at least a portion of the gas turbine engine wall when the locking feature is in the locked position.

5. The push-lock pin of claim 1, wherein the stop member is a collar extending radially from the housing.

6. The push-lock pin of claim 1, wherein the locking mechanism comprises a plurality of spherical bearings positioned to move radially outward and inward in response to an axial position of the shaft assembly relative to the housing.

7. The push-lock pin of claim 1, wherein the push-down pop-up mechanism comprises a separate pin component and a cam having a low equilibrium point and a high equilibrium point, wherein a biasing member is maintained in a more biased state when the cam is at the high equilibrium point, and the biasing member is maintained in a less biased state when the cam is at the low equilibrium point.

8. The push-lock pin of claim 1, wherein the locking mechanism comprises a plurality of tapered blocks positioned to move radially outward and inward in response to an axial position of the shaft assembly relative to the housing.

9. The push-lock pin of claim 8, wherein each of the plurality of tapered blocks rides against outwardly facing planar surfaces of the shaft when the locking mechanism is moved between the locked position and an unlocked position.

10. The push-lock pin of claim 8, wherein the shaft comprises a rotatable portion and a separate fixed portion that interfaces with the plurality of tapered blocks.

11. A gas turbine engine assembly comprising:
a tile; and
a shaft assembly within a housing, the shaft assembly including a push-down pop-up mechanism and a locking mechanism, the locking mechanism moveable to a locked position such that the locking mechanism limits movement of the tile away from a gas turbine engine wall; and
a floating support secured to the gas turbine engine wall, the floating support providing an aperture that receives the shaft assembly.

12. The gas turbine engine assembly of claim 11, wherein the floating support is laterally adjustable relative to the gas turbine engine wall when secured to the gas turbine engine exhaust gas path wall.

13. The gas turbine engine assembly of claim 11, wherein the floating support comprises a cup-shaped portion that extends through the aperture in the gas turbine engine wall.

14. The gas turbine engine assembly of claim 11, including a shaft assembly within the housing wherein the shaft comprises a locking mechanism, and a push-down pop-up mechanism, a cap connected to a first axial end of the shaft, and a spring connected to a second axial end of the shaft, wherein the second axial end is axially opposite the first axial end.

15. The gas turbine engine assembly of claim 14, wherein the tile comprises a ceramic tile.

16. The gas turbine engine assembly of claim 14, wherein the locking mechanism comprises a ball lock section of the shaft and a locking feature, wherein the ball-lock section has a larger diameter than a remainder of the shaft, and the locking feature is adjacent the ball-lock section of the shaft when the shaft is in a locked position.

17. The gas turbine engine assembly of claim 14, wherein the cap protrudes from a ceramic tile surface face when the shaft mechanism is in an unlocked position, thereby operating as a handle.

18. A method of connecting a tile to a gas turbine engine wall, comprising:
using a push-down pop-up mechanism to move a locking mechanism between an unlocked position and a locked position;

limiting movement of a tile away from a gas turbine engine wall when the locking mechanism is in the locked position; and limiting movement of the tile toward the gas turbine engine wall using a stop member whether the locking mechanism is in the unlocked or the locked position.

19. The method of claim 18, moving a plurality of tapered blocks of the locking mechanism to move between the unlocked position or the locked position.

20. The method of claim 19, wherein each of the plurality of tapered blocks rides against outwardly facing planar surfaces when the locking mechanism is moved between the unlocked position and the locked position.

\* \* \* \* \*